Sept. 27, 1927.
J. E. ALLEN
1,643,760
DRIVING ROD BEARING FOR LOCOMOTIVES
Filed Aug. 7, 1925
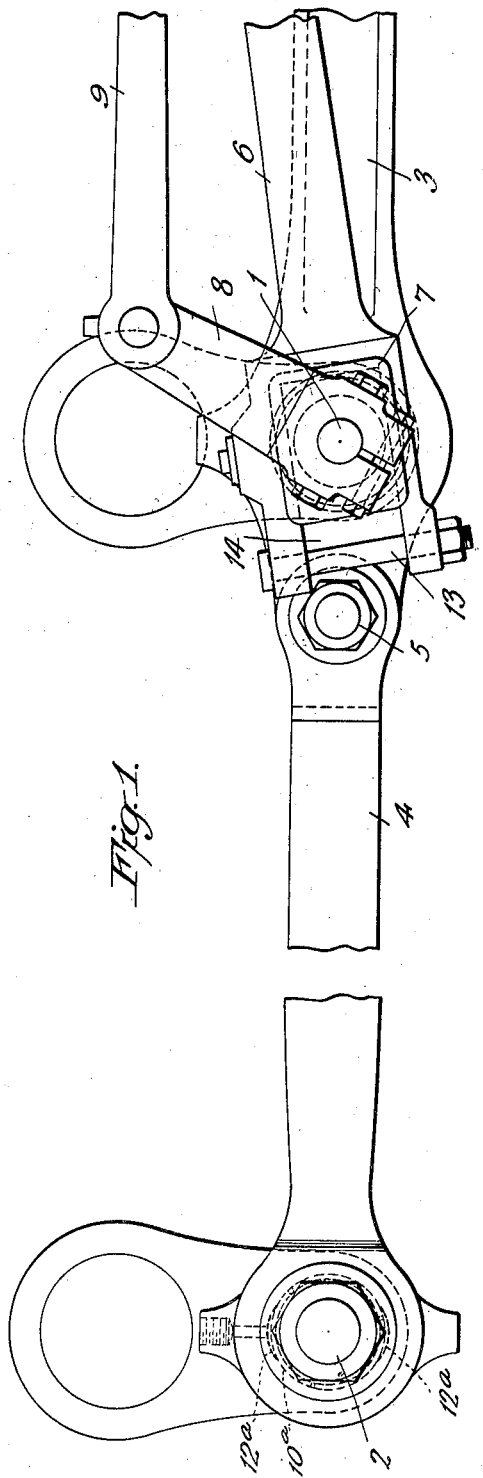
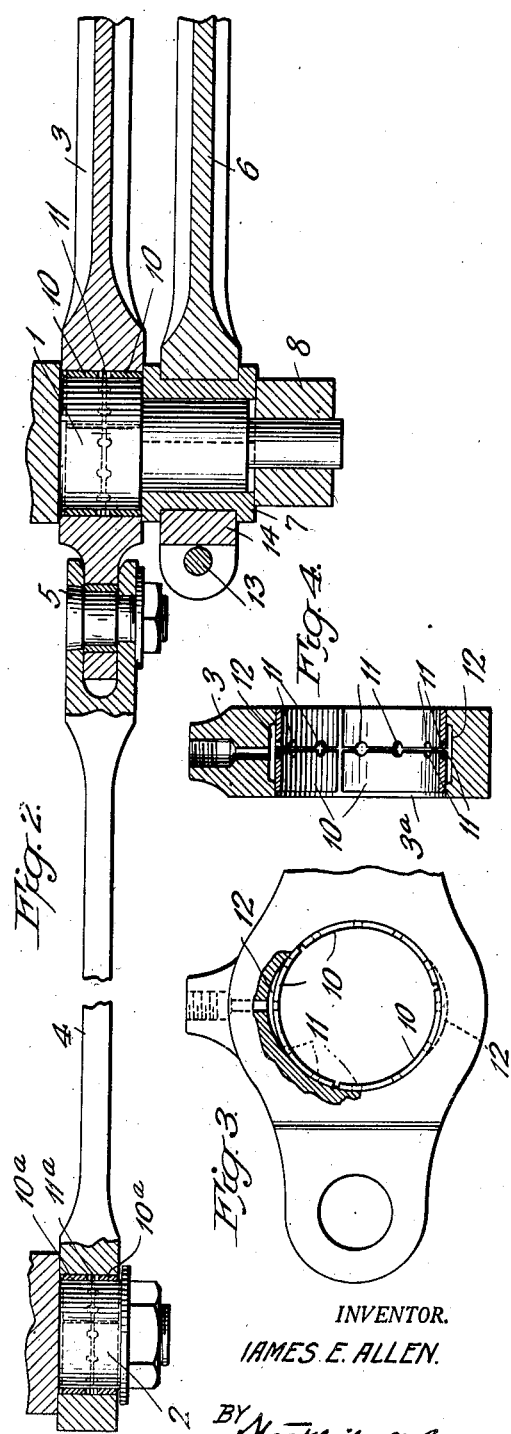
INVENTOR.
IAMES E. ALLEN.
BY
ATTORNEYS Patented Sept. 27, 1927.

1,643,760

UNITED STATES PATENT OFFICE.

JAMES E. ALLEN, OF PERU, INDIANA.

DRIVING-ROD BEARING FOR LOCOMOTIVES.

Application filed August 7, 1925. Serial No. 48,782.

Because of the heavy duty imposed upon locomotive drive rod bearings, such as the bearings of the side rods and connecting or main rods these bearings require relatively frequent renewal and it is therefore very desirable that the time necessarily consumed as well as the labor required in this operation be minimized. An undue delay is involved under present practice in the renewal of the bushings which form the side rod bearings, locomotives being usually laid up for more than a day for this purpose. This is due principally to the fact that a considerable amount of machining is required. The bushings which are almost universally of brass, are externally machined to the bore in the side rod and are commonly keyed thereto, and are also internally machined to the diameter of the crank pin. The old or worn bushings therefore have to be knocked or pressed out, thereby necessitating the removal of the rods from the crank pins for this purpose, and in the case of the main crank pin also necessitating the removal of the eccentric crank and of the connecting rod with its bearing block. This requires the expenditure of considerable time and labor because of the massive character of these parts, and that, together with the machining and fitting of the new bushings and replacement of the side rods and associated parts makes the operation of renewing the bushings altogether unwarrantedly lengthy and difficult.

One object of this invention is to provide a bushing construction which will simplify and expedite their renewal, and in fact bushings embodying my invention may be renewed in a very few moments. All machining work is obviated as well as the need for removing the side rods and associated members bearing on the crank pins to provide access to the bushings or to enable the worn bushing to be removed. Another object is economy in the brass required for the bushings. Another object is to improve the distribution of the lubricant to the bearing. Another object is to equalize the wear of the bearing. Still other objects will be apparent from the following description.

In accordance with my invention, I make the bushing which forms the bearing of such a character that it is easily inserted and removed by movement of the bushing in a lengthwise direction of the crank pin when the member on the crank pin which retains the rod in place is removed. It has heretofore been the standard practice to fit these bushings with extreme care in the belief that this careful fitting was required by reason of the heavy duty to which the bearings are subjected. I have discovered and demonstrated by numerous tests on locomotives that not only is the life of the bearing substantially prolonged by having a sufficiently loose fit to float in the rod, but it is in every other respect as satisfactory as the machined and fitted bushings in common use.

I have found that when the bushing is split, it will best adapt itself to the service of such a heavy duty bearing, and it has been my practice to compose the bushing of a plurality of circumferential sections which form a substantially complete circle when assembled in the bearing, although as a rule I provide a little space between the sections so as to avoid any possibility of the jamming of the sections in the bearing. This circumferential spacing of the sections has also other advantages, particularly in connection with the distribution of the lubricant to the bearing.

These bearings are commonly lubricated by hard grease which is forced into the bearing through grease cups or the like. I have in some cases found it satisfactory merely to provide grease holes through the sections of the bushing, but I have obtained the best results in the distribution of the lubricant by splitting the bushing circumferentially and proportioning the sections so that they have a certain amount of longitudinal play on the crank pin. This I have found to be very effective in working the grease into the bearing.

It will be appreciated that this innovation in the character of bushings for locomotive drive rods economizes very substantially in the labor and time required for renewing a bushing and also in the amount of brass used for a bushing, and that by reason of the fact that it is loose enough to float it works around and distributes the wear and so gives longer service than the bushing with the greater amount of material as formerly employed.

The several bushing sections forming the complete bearing may be substantial duplicates of one another and these sections may be stamped from rolled brass or may be cast, in either case being made complete and of the dimensions required, and being used just as they are stamped or cast without the necessity of any turning or other machine work whatsoever.

An embodiment of the invention is illustrated in the accompanying drawings in which:

Fig. 1 is a side elevation showing portions of locomotive side rods embodying the invention, together with the main and rear crank pins and other associated parts;

Fig. 2 is a horizontal longitudinal section centrally of the crank pins which are shown in plan;

Fig. 3 is a somewhat enlarged elevation, partly in section, of the rear end of the side rod in which the main crank pin is journaled; and Fig. 4 is a vertical section taken axially of the bearing in Fig. 3.

The drawings illustrate the embodiment of the invention in the crank pin bearings of the side rods or coupling rods of a locomotive and the parts shown include the main crank pin 1, which at its inner end is carried by a crank arm which as usual is connected to or forms a part of a driving wheel, and the rear crank pin 2 similarly carried at its inner end by the crank arm of a rear driving wheel. The side rod 3, which has in its rear end my improved bearing, bears at this end on the main crank pin 1 and provides a connection between the corresponding drive wheel and the one immediately in front. The rear side rod 4, which has a crank pin bearing embodying the present invention, bears at its rear end on the rear crank pin 2 and has its front end bifurcated and pivotally connected by the transverse screw 5 to a rearward extension on the side rod 3. The front and intermediate crank pins and the side rod connections thereto are omitted, but it is understood that the crank pin bearings for the front and intermediate crank pins will be the same as that employed for the rear side rod 4 on the rear crank pin 2. The main rod or connecting rod 6 bears on a reduced extension of the main crank pin 1 directly in front of the side rod 3 through an intermediary two-part bearing block 7 of usual construction. The eccentric crank 8, such as is employed upon many locomotives, is clamped on the still further reduced outer end portion of the main crank pin 1 and is pivotally connected at its free end with the valve operating eccentric rod 9, as usual.

The improved floating bearing for the intermediate side rod 3 on the main crank pin 1 will now be described. Through the solid material of the somewhat enlarged end of the side rod 3 there is provided a bore 3$^a$ of sufficiently larger diameter than the crank pin 1 for the reception therein of the improved bearing in which the crank pin is journaled. This bearing, in the illustrated embodiment of the invention, comprises six similar arcuate sections or parts 10, these sections being somewhat thinner than the annular space between the crank pin and the circular wall of the side rod bore so that they may be easily and freely slipped into place and as readily removed therefrom in an endwise or longitudinal direction relatively to the crank pin. The sections 10 are arranged in two longitudinally end to end circumferential series with three of such sections in each series. The external arcuate curvature of the sections 10 is made such as to provide for a slight annular clearance space between these sections and the wall of the bore 3$^a$. The arcuate length of the bushing sections 10 is somewhat less than 120° so as to leave between the ends of the sections sufficient space so that the sections can never become wedged or jammed against each other in the opening 3$^a$. The width of the sections is such as to provide for the usual fillet and at the same time allow for some lateral play effective in distribution of the lubricant. The inner side edges of the bushing sections 10 are provided with lubricant conveying and distributing notches or recesses 11 which may be of semi-circular outline as shown in the drawings. Circumferentially extending lubricant distributing channels or grooves 12 are provided in the side rod 3 at the top and bottom and, as clearly shown, are in communication with the recesses 11 and with the circumferential division between the adjacent ends of the sections 10. The upper channel 12 may be supplied with lubricant through a passage leading from a threaded socket for a usual grease cup, as shown.

The improved bearing for the rear side rod 4 on the rear crank pin 2 is of the same construction as that just described for the intermediate side rod 3 on the main crank pin 1, being properly proportioned for the crank pin 2. This bearing comprises arcuate bushing sections 10$^a$ provided on their adjacent ends with lubricant distributing semi-circular recesses 11$^a$ and upper and lower lubricant distributing channels 12$^a$ are provided in the side rod 4, and, as indicated in Fig. 1 the side rod 4 is provided with a passage leading from a threaded socket for a grease cup and communicating with the upper channel 12ª.

In renewing the improved bearing for the main crank pin 1, the clamping bolt 13 will first be removed from the bearing end of the connecting rod 6, the block 14, which may be a wedge, will then come out and the rear half of the bearing block 7 is then removed. The connecting rod 6 may then be pushed forward sufficiently to be out of the way and so as to give free access to the bearing of the side rod 3 on the crank pin 1. The side rod 3 will be jacked up so as to relieve the bushing sections at the top from the weight of the side rod as well as to provide sufficient clearance for the free movement of the bushing sections. The worn bushing sections can then be easily removed by means of a suitable tool and new bushing sections may be freely pushed into place in the opening 3ª around the crank pin 1. With the bushing in three parts circumferentially, it is easy to remove and replace. The connecting rod 6 is then pulled back into place, the rear half of the bearing block 7 and the bolt 13 replaced and the wedge 14 driven in. This entire operation requires only a few minutes and the locomotive is therefore not required to be taken out of service for renewing the bearing.

When the locomotive is in service the entire bearing comprising the circumferentially and longitudinally spaced bushing sections 10 is free to shift around in the opening 3ª and it is found in practice that such shifting takes place, thereby substantially evenly distributing the wear on the bearing from the rotation of the crank pin 1 therein. Also in service the bushing sections 10 shift longitudinally in the opening 3ª relatively to the side rod 3 and crank pin 1 and also relatively to each other and thereby force out the lubricant from between them into the space between the crank pin and the bearing, such lubricant commonly being comparatively hard grease. The rotative shifting movements of the bearing sections 10 are effective in distributing the lubricant around the crank pin 1 by means of the recesses 11 as well as to some extent by reason of the circumferential spacing of these sections. Some of the lubricant supplied to the upper channel 12 collects in the lower channel 12 from which it is further distributed to the crank pin. It has been found that the crank pin rotating in the sectional bearing peens the sections 10 to the wall of the opening 3ª, but in this peening action the bearing sections never become jammed against the wall of the opening 3ª so as to be held thereby, but remain at all times free to shift therein as above described. It is to be further noted that the bearing end of the side rod 3 has not been weakened by any cutting away to provide for any keys or keeper bolts such as have been commonly employed for securing in place the hereinbefore mentioned relatively heavy bushing heretofore employed, so that in this improved bearing construction there are thick walls surrounding the opening 3ª, providing adequate strength and thereby increasing the factor of safety.

With the rear side rod 4 on the rear crank pin 2, as well as with front and intermediate crank pins, it is only necessary to remove the nut and washer shown on the crank pin in order to provide free access to the bearing formed by bushing sections 10ª. This end of the side rod will be jacked up so as to relieve its weight from the bushing sections at the top and so as to leave them free for movement whereupon the worn bushing sections may be removed and new ones inserted quickly and easily. The above noted manner of operation in service of the bearing provided by the bushing sections 10 for the main crank pin 1 is in like manner true of the bearing provided by the bushing sections 10ª for the rear crank pin 2.

A way to apply my improved bearing to the connecting rod is shown and claimed in my copending application, filed September 12, 1925, Serial No. 55,982.

It is obvious that various modifications may be made in the bearing construction above described and illustrated in the accompanying drawings within the principle and scope of my invention.

I claim:

1. The combination with a locomotive crank pin and means detachably attached to the free end of the crank pin for retaining a driving rod thereon, of a driving rod, and a driving rod bearing comprising a longitudinally split floating bushing divided circumferentially into sections proportioned to provide for play thereof along the crank pin and which by detaching said retaining means are freely removable and replaceable in an endwise direction while the driving rod is on the crank pin.

2. The combination with a locomotive crank pin and means detachably attached to the free end of the crank pin for retaining a driving rod thereon, of a driving rod, and a driving rod bearing comprising a floating bushing divided longitudinally into a plurality of arcuate sections aggregating slightly less than a complete circle and divided circumferentially into sections proportioned to provide for play thereof along the crank pin and which by detaching said retaining means are freely removable and replaceable in an endwise direction while the driving rod is on the crank pin.

3. The combination with a locomotive crank pin and means detachably attached to the free end of the crank pin for retaining a driving rod thereon, of a driving rod, and a driving rod bearing comprising a longitudinally split floating bushing divided circumferentially into sections proportioned to provide for play thereof along the crank pin, the inner side edges of said sections having lubricant distributing recesses therein, which sections by detaching said retaining means are freely removable and replaceable in an endwise direction while the rod is on the crank pin.

In witness whereof, I hereunto subscribe my signature.

JAMES E. ALLEN.